Jan. 13, 1942. H. KLEMPERER 2,269,460
CONDENSER WELDING SYSTEM
Filed Feb. 5, 1940

INVENTOR.
HANS KLEMPERER,
BY Elmer J. Gorn
ATTY.

Patented Jan. 13, 1942

2,269,460

UNITED STATES PATENT OFFICE 2,269,460

CONDENSER WELDING SYSTEM

Hans Klemperer, Belmont, Mass., assignor to Raytheon Manufacturing Company, Newton, Mass., a corporation of Delaware Application February 5, 1940, Serial No. 317,361

13 Claims. (Cl. 219—4)

This invention relates to welding systems in which electrical energy is stored in a condenser and then discharged into a welding load circuit in order to deliver welding current to a resistance welding load. Various systems of this type have been devised in which the condenser discharge delivers a substantially unidirectional pulse of current to the welding load. In systems of this kind there is often a relatively long period of decay of the current, and for various purposes it is desirable to stop the current flow in the welding load in a shortened period of time. In my application, Serial No. 317,360, filed simultaneously herewith, for an improvement in Condenser welding systems, I have described and claimed various systems in which the decay current is stopped and the energy still remaining in the load circuit is restored to the condenser in such a direction as to be available for subsequent welding operations.

An object of this invention is to devise another form of system for accomplishing the foregoing results.

Another object is to perform the necessary functions in a reliable manner with a simplified arrangement.

A further object is to perform these functions with a minimum of control tubes.

The foregoing and other objects of this invention will be best understood from the following description of an exemplification thereof, reference being had to the accompanying drawing, wherein.

Figure 1:
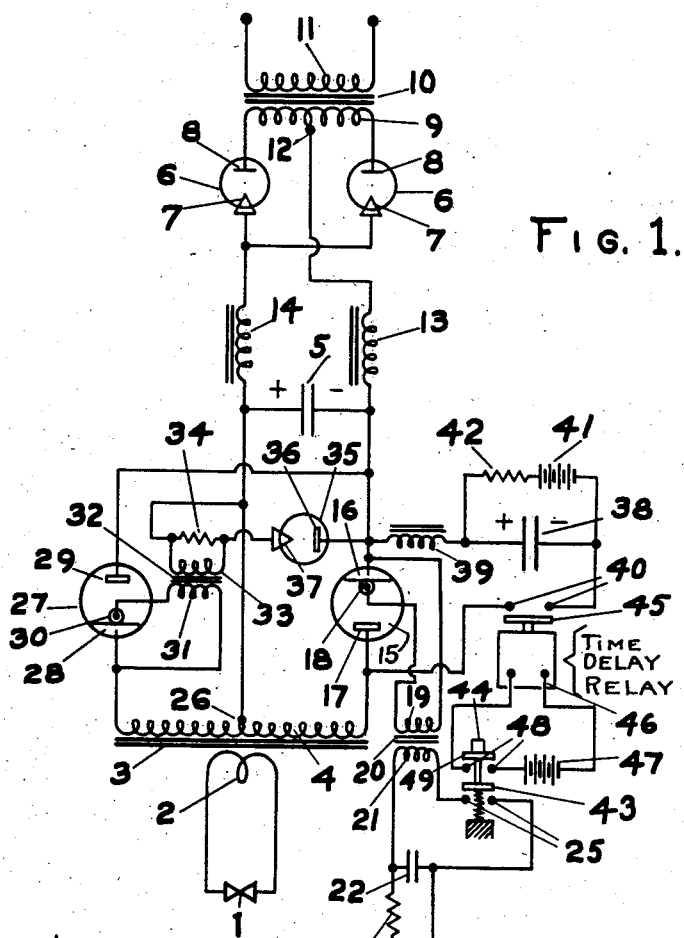
Fig. 1 is a diagram of a condenser welding system embodying my invention.

In the arrangement shown in the drawing, welding current is to be supplied to a resistance welding load 1 from the secondary winding 2 of a welding transformer 3 provided with a primary winding 4. The energy necessary to accomplish welding is adapted to be supplied to the primary winding 4 from a condenser 5. This condenser is adapted to be charged from any suitable source of direct current, such as a direct current generator, battery, rectifier, or the like. In Fig. 1 the direct current is shown as being supplied from a pair of rectifier tubes 6. These tubes may be of the gas or vapor-filled type having permanently-energized cathodes 7. These cathodes may be thermionic filaments or any other suitable type of cathode. The rectifier tubes 6 are provided with anodes 8 which are connected to opposite sides of the secondary winding 9 of a charging transformer 10, whose primary winding 11 is adapted to be connected to a suitable source of alternating current. The secondary winding 9 is provided with a center tap 12 which is connected through an impedance 13 to the negative side of the condenser 5. The two cathodes 7 are connected together through an impedance 14 to the positive side of the condenser 5. The impedances 13 and 14 are preferably inductances, and are of a value to maintain a reasonable charging rate for the condenser 5. Thus when the primary winding 11 is energized, charging current is supplied to the condenser 5, which thereupon is charged to a predetermined voltage. The primary winding 4 of the welding transformer 3 is provided with a tap 26 intermediate the ends thereof. The condenser 5 is adapted to be discharged through the portion of the primary winding 4 between the tap 26 and the right end of said primary winding. For this purpose the positive side of the condenser 5 is connected directly to the tap 26 while the negative side of the condenser 5 is connected to the right end of the primary winding 4 through a controlled ignition discharge tube 15. The tube 15 is preferably of the pool cathode type with an igniter for initiating a cathode spot on the pool in order to cause the tube to conduct current. The tube 15 is provided with a pool cathode 16, preferably of mercury, connected to the negative side of the condenser 5, and with an anode 17 connected to the right end of the primary winding 4. The tube 15 is also provided with an igniter 18. Although this igniter may be of any suitable type, it preferably is of the electrostatic type consisting of a conductor separated and insulated from the cathode by a thin glass layer. In order to supply the igniter 18 with an igniting impulse for initiating the discharge of the condenser 5, a secondary winding 19 of an igniting transformer 20 is connected between the igniter 18 and its associated cathode 16. The igniting transformer 20 is provided with a primary winding 21. This primary winding is adapted to be supplied with a pulse of current for igniting purposes from a condenser 22 which may be suitably charged from a source of direct current, such as a battery 23 in series with a current-limiting resistance 24. A pair of contacts 25 is interposed between the primary winding 21 and the condenser 22. When the contacts 25 are closed, the condenser 22 discharges through the primary winding 21, delivering an igniting impulse to the igniter 18.

In order to provide for exponential decay of the current supplied to the welding load 1, as will be described below, an additional controlled ignition discharge tube 27, preferably of the same type as tube 15, is connected between the left end of the primary winding 4 and the negative side of the condenser 5. The tube 27 is provided with a pool cathode 28 connected to the left end of the primary winding 4, and with an anode 29 connected to the negative side of the condenser 5. The tube 27 is also provided with an igniter 30, preferably of the same type as igniter 18. In order to supply the igniter 30 with igniting impulses, the secondary winding 31 of an igniting transformer 32 is connected between the igniter 30 and its associated cathode 28. The igniting transformer 32 is also provided with a primary winding 33 connected across a resistance 34 which is connected in series with a rectifier tube 35 across the condenser 5. The rectifier tube 35 may be of small current-carrying capacity, but is one which should withstand the negative voltage applied to the condenser 5. This tube is provided with an anode 36 connected to the negative side of the condenser 5, and with a permanently-energized type of cathode 37 connected in series with the resistance 34 to the positive side of the condenser 5. Thus when said condenser is initially charged through the inductances 13 and 14, the voltage on the tube 35 is impressed upon it in the non-conducting direction, and therefore said tube does not conduct current.

In order to extinguish the discharge in the tube 15 at the proper time, as will be explained below, there is provided a condenser 38 which is adapted to be connected in series with a small inductance 39 directly across the tube 15. Interposed in this circuit is a pair of contacts 40 which when closed completes the circuit. In order to supply to the condenser 38 a voltage capable of extinguishing the discharge in the tube 15, said condenser is adapted to be charged from some suitable direct current source, such as a battery 41 through a current-limiting resistance 42. The polarity of the battery 41 is so chosen that when the contacts 40 are closed, a positive voltage is impressed on the cathode 16 and a negative voltage on the anode 17.

The contacts 25 are adapted to be closed by an armature 43 of a pushbutton switch 44. The contacts 40 are adapted to be closed by an armature 45 of a time delay relay 46. The time delay relay is of a type which when supplied with current closes the contacts 40 after a predetermined time. This relay is preferably adjustable in order that predetermined time delay intervals may be selected at will. The relay 46 is adapted to be actuated by current supplied from a suitable source, such as a battery 47. This battery is connected to the relay 46 through a circuit in which is interposed a pair of contacts 48. These contacts are adapted to be closed by an armature 49 likewise carried by the pushbutton switch 44.

Figure 2:
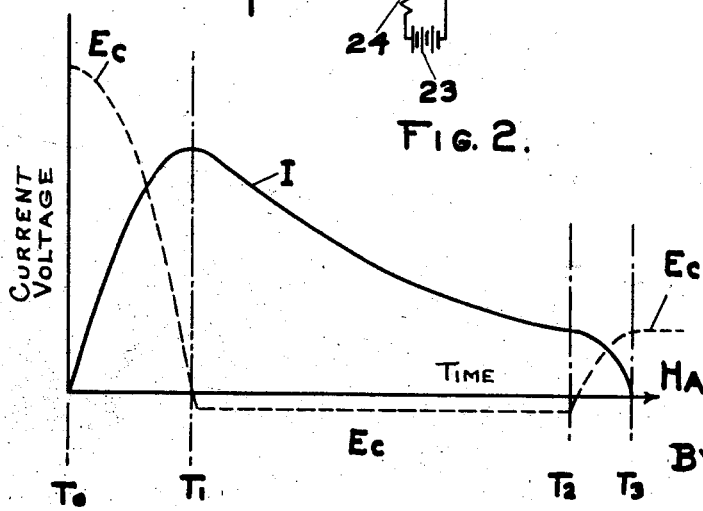
Fig. 2 is a set of curves illustrating the mode of operation of my invention.

The operation of the system described in Fig. 1 may be understood more clearly by referring to the curves shown in Fig. 2. These curves do not purport to show the operation of the system quantitatively, although they do represent in a general qualitative manner the nature of said operation. The solid curve I represents the current delivered from the condenser 5 to the welding load. The dotted curve Ec represents the voltage across the condenser 5. At the time $T_0$, the pushbutton 44 is depressed, closing the contacts 25 and 48. Closure of the contacts 25 ignites the tube 15, and therefore discharge current flows from the condenser 5 through the portion of the primary winding between the tap 26 and the right end thereof, and back through the tube 15. This current I rises to a maximum value while the voltage of the condenser 5, Ec, falls to zero at the time $T_1$. At this time, due to the fact that the voltage Ec reverses, the tube 35 conducts a pulse of current which supplies an igniting impulse through the transformer 32 to the igniter 30, which thereupon fires the tube 27. Due to the energy which was stored in the load circuit, including the transformer, the current tends to continue to flow in the same direction as previously, and therefore this current flows through the primary winding 4 and through the tubes 15 and 27 in series. The conducting path across the primary winding 4 provided by the tubes 15 and 27 is a relatively low impedance shunt path across said primary winding, and therefore the current flows freely through this circuit and decays substantially exponentially as indicated by the curve in Fig. 2 between the times $T_1$ and $T_2$. After the predetermined time interval $T_1$—$T_2$ determined by the setting of the time delay relay 46, the armature 45 closes the contacts 40, thus connecting the charged condenser 38 across the tube 15. The polarity of the condenser 38, as described above, tends to force the current through the tube 15 in the non-conducting direction, and therefore extinguishes conduction in said tube. At the time $T_2$, however, a substantial amount of energy is still stored in the load circuit, including the transformer 8, and this energy tends to cause the current to continue to flow in the same direction as before. A path for this current is provided from the tap 26 through the condenser 5, the anode 29, the cathode 28, through the left portion of the primary winding 4, back to the tap 26. The current which thus flows feeds energy into the condenser 5, and charges it in the same polarity as that to which it was originally charged by the rectifier tubes 6. Thus the energy which was stored in the load circuit is restored to the condenser 5 in the correct polarity so as to be available for the next welding operation. Due to the fact that the charging circuit for the condenser 5 established through the tube 27 is of relatively low impedance, the condenser 5 quickly acquires a charge which tends to oppose further current flow, and therefore the current I quickly falls to zero at the time $T_3$, whereupon the tube 27 is extinguished. Thereupon the voltage Ec can again rise to its initial value due to the charging current supplied from the rectifier tubes 6.

Of course it is to be understood that this invention is not limited to the particular details as described above as many equivalents will suggest themselves to those skilled in the art. Other arrangements for extinguishing the discharge in the tube 15 may be devised. Also other types of discharge tubes or circuit-connecting means may be utilized instead of those shown herein. Various other ideas as to the utilization of the principles enunciated and claimed herein will suggest themselves to those skilled in the art. It is accordingly desired that the appended claims be given a broad interpretation commensurate with the scope of the invention within the art.

What is claimed is:

1. A welding system comprising a condenser, means for charging said condenser, a welding transformer having windings with input and output connections, a welding load circuit coupled to said output connections, said input connections providing a plurality of connections to spaced points on said windings, one side of said condenser being connected to one of said points, circuit-controlling means for closing a connection from the other side of said condenser to a second point on said windings to deliver a pulse of discharge current to said transformer, and circuit-controlling means for connecting a third point on said windings to said other side of said condenser upon substantially complete discharge of said condenser.

2. A welding system comprising a condenser, means for charging said condenser, a welding transformer having windings with input and output connections, a welding load circuit coupled to said output connections, said input connections providing a plurality of connections to spaced points on said windings, one side of said condenser being connected to one of said points, circuit-controlling means for closing a connection from the other side of said condenser to a second point on said windings to deliver a pulse of discharge current to said transformer, and circuit-controlling means for connecting a third point on said windings to said other side of said condenser upon substantial discharge of said condenser.

3. A welding system comprising a condenser, means for charging said condenser, a welding transformer having windings with input and output connections, a welding load circuit, including a welding load, coupled to said output connections, said input connections providing a plurality of connections to spaced points on said windings, one side of said condenser being connected to one of said points, circuit-controlling means for closing a connection from the other side of said condenser to a second point on said windings to deliver a pulse of discharge current to said transformer, and circuit-controlling means for connecting a third point on said windings to said other side of said condenser upon substantial discharge of said condenser.

4. A welding system comprising a condenser, means for charging said condenser, a welding transformer having windings with input and output connections, a welding load circuit coupled to said output connections, said input connections providing a plurality of connections to spaced points on said windings, one side of said condenser being connected to one of said points, circuit-controlling means for closing a connection from the other side of said condenser to a second point on said windings to deliver a pulse of discharge current to said transformer, circuit-controlling means for connecting a third point on said windings to said other side of said condenser upon substantial discharge of said condenser, and means for opening the connection to said second point when said discharge current has fallen to a relatively low value.

5. A welding system comprising a condenser, means for charging said condenser, a welding transformer having windings with input and output connections, a welding load circuit coupled to said output connections, said input connections providing a plurality of connections to spaced points on said windings, one side of said condenser being connected to one of said points, circuit-controlling means for closing a connection from the other side of said condenser to a second point on said windings to deliver a pulse of discharge current to said transformer, circuit-controlling means for connecting a third point on said windings to said other side of said condenser upon substantial discharge of said condenser, and means for opening the connection to said second point at a predetermined time interval after the initiation of the operation of the first-named circuit-controlling means.

6. A welding system comprising a condenser, means for charging said condenser, a welding transformer having windings with input and output connections, a welding load circuit coupled to said output connections, said input connections providing a plurality of connections to spaced points on said windings, one side of said condenser being connected to one of said points, a controlled ignition discharge tube for closing a connection from the other side of said condenser to a second point on said windings to deliver a pulse of discharge current to said transformer, circuit-controlling means for connecting a third point on said windings to said other side of said condenser upon substantial discharge of said condenser, and means for impressing a discharge-extinguishing voltage on said discharge tube when said discharge current has fallen to a relatively low value.

7. A welding system comprising a condenser, means for charging said condenser, a welding transformer having windings with input and output connections, a welding load circuit coupled to said output connections, said input connections providing a plurality of connections to spaced points on said windings, one side of said condenser being connected to one of said points, a controlled ignition discharge tube for closing a connection from the other side of said condenser to a second point on said windings to deliver a pulse of discharge current to said transformer, circuit-controlling means for connecting a third point on said windings to said other side of said condenser upon substantial discharge of said condenser, and means for impressing a discharge-extinguishing voltage on said discharge tube at a predetermined time interval after the initiation of the operation of said discharge tube.

8. A welding system comprising a condenser, means for charging said condenser, a welding transformer having windings with input and output connections, a welding load circuit coupled to said output connections, said input connections providing a plurality of connections to spaced points on said windings, one side of said condenser being connected to one of said points, a controlled ignition discharge tube for closing a connection from the other side of said condenser to a second point on said windings to deliver a pulse of discharge current to said transformer, circuit-controlling means for connecting a third point on said windings to said other side of said condenser upon substantial discharge of said condenser, a second condenser adapted to be charged with a predetermined polarity, and means for connecting said condenser across said discharge tube for impressing a discharge-extinguishing voltage on said discharge tube when said discharge current has fallen to a relatively low value.

9. A welding system comprising a condenser, means for charging said condenser, a welding transformer having windings with input and output connections, a welding load circuit coupled to said output connections, said input connections providing a plurality of connections to spaced points on said windings, one side of said condenser being connected to one of said points, a controlled ignition discharge tube for closing a connection from the other side of said condenser to a second point on said windings to deliver a pulse of discharge current to said transformer, circuit-controlling means for connecting a third point on said windings to said other side of said condenser upon substantial discharge of said condenser, a second condenser adapted to be charged with a predetermined polarity, and means for connecting said condenser across said discharge tube for impressing a discharge-extinguishing voltage on said discharge tube at a predetermined time interval after the initiation of the operation of said discharge tube.

10. A welding system comprising a condenser, means for charging said condenser, an inductance having magnetically-coupled windings, a welding load, a discharge circuit for discharging said condenser through at least part of said windings and said load, a shunt circuit across at least part of said windings, one of said parts including a winding which is not common to the other of said parts, a recharging circuit for feeding energy from said inductance back to said condenser in the same polarity as the original charge thereon, and two circuit-controlling means, one of which is common to at least two of said circuits for establishing said circuits in sequence.

11. A welding system comprising a condenser, means for charging said condenser, an inductance having magnetically-coupled windings, a welding load, a discharge circuit for discharging said condenser through one of said windings and said load, a shunt circuit across said last-named winding and an additional winding of said inductance, circuit-controlling means common to said discharge circuit and said shunt circuit, a second circuit-controlling means in series with the first-named circuit-controlling means in said shunt circuit, means for operating each of said circuit-controlling means to establish their associated circuits, and means for operating said first-named circuit-controlling means to open its associated circuits.

12. A welding system comprising a condenser, means for charging said condenser, an inductance having magnetically-coupled windings, a welding load, a discharge circuit for discharging said condenser through one of said windings and said load, a shunt circuit across said last-named winding and an additional winding of said inductance, circuit-controlling means common to said discharge circuit and said shunt circuit, and a second circuit-controlling means in series with the first-named circuit-controlling means in said shunt circuit.

13. A welding system comprising a condenser, means for charging said condenser, an inductance having magnetically-coupled windings, a welding load, circuit-controlling means for discharging said condenser through one of said windings and said load, circuit-controlling means for establishing a shunt circuit across said last-named winding and an additional winding of said inductance to maintain flow of current therein when said condenser has become substantially discharged, means for suppressing the flow of current through the first-named circuit-controlling means when the current flowing in said shunt circuit has fallen to a lower value, said additional winding being connected across said condenser in series with the second-named circuit-controlling means.

HANS KLEMPERER.